(12) United States Patent
Kume

(10) Patent No.: US 6,212,481 B1
(45) Date of Patent: Apr. 3, 2001

(54) METHOD AND APPARATUS FOR AUTOMATIC SHAPE COMPUTING FOR CONTOUR SHAPE DETERMINING MACHINE

(75) Inventor: Shigefumi Kume, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 0 days.

(21) Appl. No.: 09/068,973

(22) PCT Filed: Nov. 30, 1995

(86) PCT No.: PCT/JP95/02450

§ 371 Date: May 22, 1998

§ 102(e) Date: May 22, 1998

(87) PCT Pub. No.: WO97/20187

PCT Pub. Date: Jun. 5, 1997

(51) Int. Cl.[7] .................................. G01B 7/28
(52) U.S. Cl. ................................. 702/167; 33/504
(58) Field of Search .................................. 702/167, 168, 702/152; 700/187; 33/503, 504

(56) References Cited

U.S. PATENT DOCUMENTS

| | | | |
|---|---|---|---|
| 5,016,199 | * 5/1991 | McMurtry et al. | 364/560 |
| 5,418,730 | * 5/1995 | Mariani et al. | 364/474.22 |
| 5,434,803 | * 7/1995 | Yoshida | 364/560 |
| 5,446,673 | * 8/1995 | Bauer et al. | 364/474.37 |
| 5,491,638 | * 2/1996 | Georgi et al. | 364/474.37 |
| 5,627,771 | * 5/1997 | Makino | 364/560 |
| 5,778,551 | * 7/1998 | Herklotz et al. | 33/554 |
| 5,781,450 | * 7/1998 | Glasson | 364/560 |
| 6,098,452 | * 8/2000 | Enomoto | 73/104 |

FOREIGN PATENT DOCUMENTS 6-050749  2/1994  (JP).

* cited by examiner

*Primary Examiner*—Patrick Assouad
(74) *Attorney, Agent, or Firm*—Nixon Peabody LLP; David S. Safran

(57) ABSTRACT

An automatically shape calculating method and apparatus for contour shape measuring machines, by which a geometric shape value and a geometric shape boundary value are calculated from shape data. A geometric shape boundary is provisionally set in accordance with the shape data, which is obtained by measuring a workpiece, and then geometric shape calculation areas are set in areas except for the vicinities of the provisionally set point, a measurement starting point and a measurement ending point. A geometric shape value of the shape data is calculated while a geometric shape of the shape data is determined under geometric shape recognition conditions for each of the set geometric shape calculation areas. The geometric shape boundary value is calculated from the calculated geometric shape value, and the calculating results are output.

9 Claims, 10 Drawing Sheets

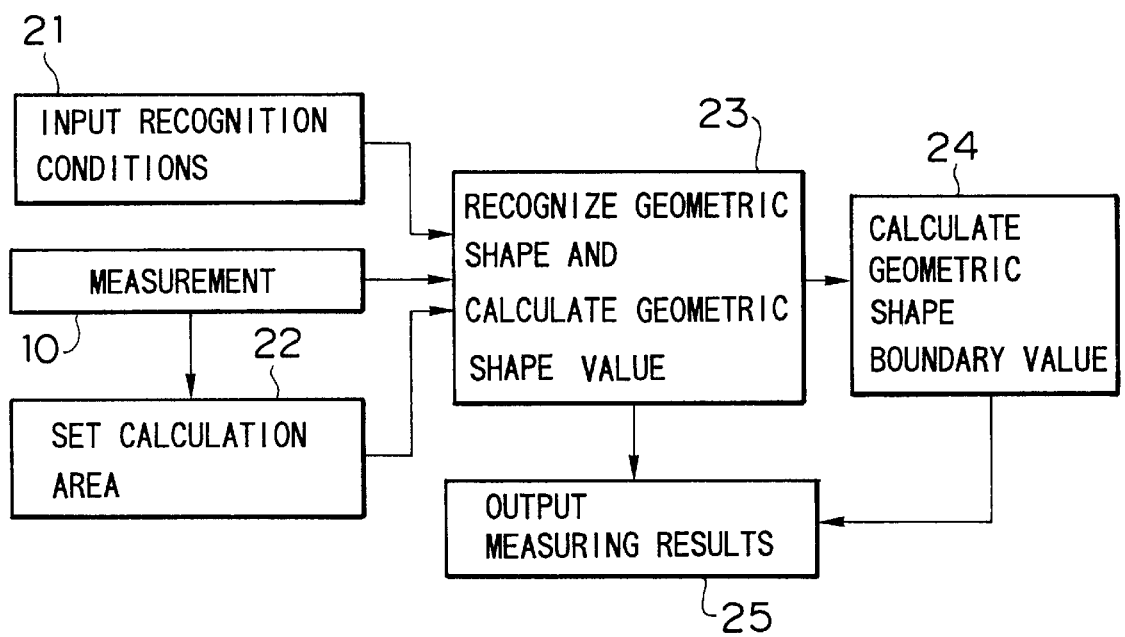
F I G. 2

F I G. 3
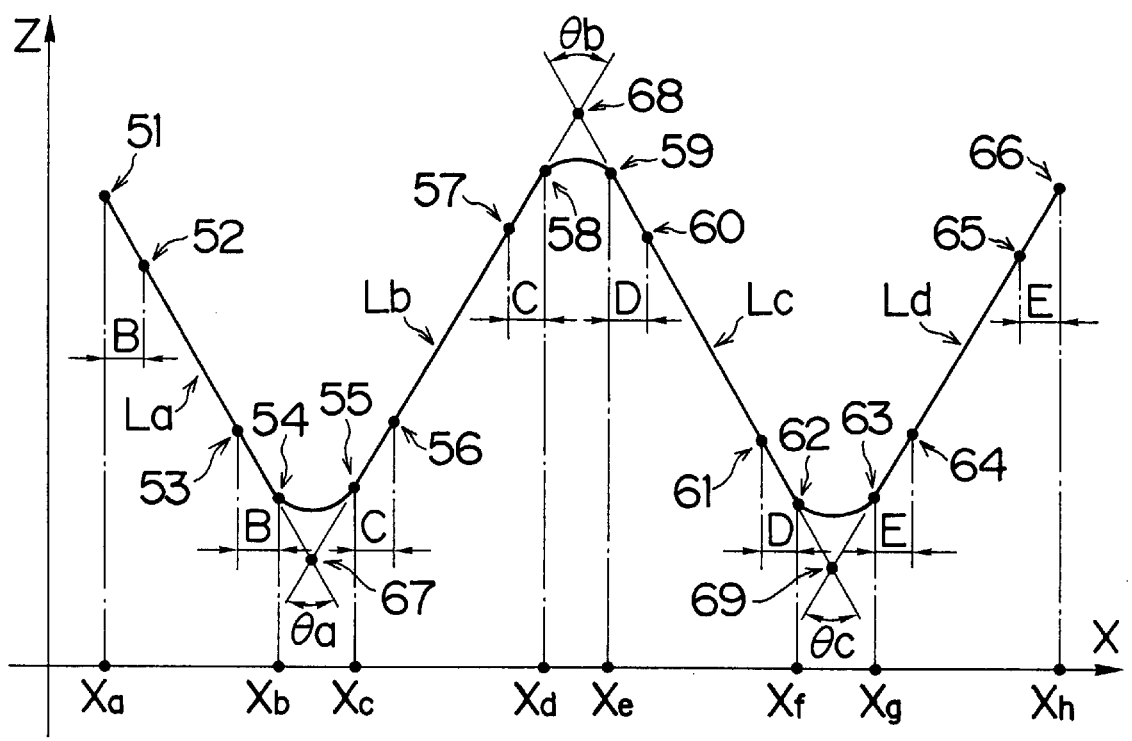

METHOD AND APPARATUS FOR AUTOMATIC SHAPE COMPUTING FOR CONTOUR SHAPE DETERMINING MACHINE

FIELD OF THE INVENTION

The present invention relates generally to an automatically shape calculating method and apparatus for a contour shape measuring machine which measures a contour shape of a workpiece to output shape data, and more particularly to an automatically shape calculating method and apparatus which has a data processing unit and automatically determines a geometric shape in accordance with the shape data to calculate a geometric shape value and a geometric shape boundary value.

BACKGROUND OF THE INVENTION

With reference to FIG. 11, a contour shape measuring machine 10 consists of a horizontally feeding mechanism 13 which is provided on a column 12 standing on a base 11, and a detector 14 which has a probe 15 and is provided on the horizontally feeding mechanism 13 in such a manner as to freely move in a horizontal direction (X). The detector 14 detects the displacement of the probe 15 in a vertical direction (Z). A scale is built in the horizontally feeding mechanism 13, and the scale detects the horizontal movement amount of the detector 14.

When the detector 14 moves in the direction X while the probe 15 is in contact with a measured area on the workpiece 16, the detector 14 detects the vertical displacement of the probe 15, and the scale of the horizontally feeding mechanism 13 detects the horizontal movement amount of the detector 14. Thus, the contour shape of the workpiece 16 is measured.

Required as measured values are a geometric shape value (such as the diameter of a circle, the longer diameter and shorter diameter of an ellipse, and the central position of a circle, which are calculated by setting the shape data to a geometric shape such as a straight line, a circle and an ellipse), and a geometric shape boundary value (such as a position of a boundary where two geometric shapes intersect each other, an angle formed by two geometric shapes which intersect each other, and the distance between boundaries).

An example of the data processing unit is provided with either a system which describes a shape view (which plots values at each measurement point in X and Z directions) by outputting the shape data directly to an X-Y plotter, or a system which has a data processing unit and displays a shape view on a CRT, or both of these two systems. According to the system which outputs the shape data to the X-Y plotter, an operator must read the geometric shape value and the geometric shape boundary value on the shape view. According to the system which has the data processing unit, the data processing unit is capable of calculating the geometric shape value and the geometric shape boundary value as explained below with reference to a flow chart of FIG. 9 and a view of FIG. 10.

First, when the operator measures the workpiece 16 by the contour shape measuring machine 10 (step 121), the CRT displays a shape view which describes measured positions (step 122). FIG. 10 shows the outline of an example in which a screw-like triangular workpiece is measured. The reference numeral 141 is a measurement starting point, and 151 is a measurement ending point.

With reference to the shape view being displayed, the operator determines and designates applicable geometric shapes (all of which are straight lines in this example.) The operator also specifies an objective area of the geometric shape value calculation (step 124). Large measurement errors normally in the vicinities of the measurement starting point 141 and the measurement ending point 150, and in an area where the shape changes greatly. An area except for those areas (e.g. an area between a point 142 and a point 143 in FIG. 10) is designated as the objective area of the geometric shape value calculation. On designation of the objective area of the geometric shape value calculation, the shape data in the designated area is calculated automatically in accordance with the designated geometric shapes (step 125), and the geometric value (a straight line Lh in the case of the area between the point 142 and the point 143) is displayed (step 126).

Then, the operator determines whether to calculate a geometric shape value in the next area of the shape view or a geometric shape boundary value (step 127). To calculate the geometric shape value in the next area, the process returns to the step 123, and the operator determines and designates the applicable geometric shape and designates areas such as "an area between a point 144 and a point 145", "an area between a point 146 and a point 147", and "an area between a point 148 and a point 149." Thereby, the geometric shape values of the straight lines Li, Lj, Lk, etc. are calculated.

To calculate the geometric shape boundary value, the operator designates two geometric shapes such as the straight lines Lh and Li (step 129). A geometric shape boundary value (coordinate values at an intersection 151 and an angle of intersection θd) of the designate geometric shapes is automatically calculated (step 130), and the calculating results are displayed (step 131). Likewise, coordinate values at an intersection 152 and an angle of intersection θe are calculated on designation of the straight lines Li and Lj. Coordinate values at an intersection 153 and an angle of intersection θf are calculated on designation of the straight lines Lj and Lk.

Thereafter, the operator returns to the step 123 in order to calculate a geometric shape value in the next area, and returns to the step 128 in order to calculate a next geometric shape boundary value (step 132).

In order to find the geometric shape value, the operator must determine and designate the type of the geometric shape corresponding to the displayed shape. The operator must also designate the objective area of the geometric shape value calculation. Likewise, in order to find the geometric shape boundary value, the operator must separately designate two geometric shapes. It takes a long time to complete such a complex operation.

The present invention has been developed in view of the above-described circumstances, and has as its object the provision of an automatic shape calculating method and apparatus for a contour shape measuring machine, the method and apparatus which automatically calculate a geometric shape value and a geometric shape boundary value in accordance with shape data without the operator's determining geometric shapes, designating objective areas of the geometric shape value calculation and designating the applicable geometric shapes of geometric shape boundaries.

SUMMARY OF THE INVENTION

To achieve the above-mentioned object, the present invention is directed to the shape calculating method for the contour shape measuring machine which comprises the steps of automatically setting the geometric shape calculation area in accordance with the shape data which is obtained by measuring the workpiece, and automatically calculating the geometric shape value and the geometric shape boundary value.

Specifically, the shape calculating method is automatically performed as follows:

(a) entering geometric shape recognition conditions;

(b) measuring a measured subject to obtain shape data;

(c) provisionally setting a geometric shape boundary of the shape data;

(d) setting a geometric shape calculation area of the shape data in areas except for vicinities of the provisionally set geometric shape boundary, a measurement starting point and a measurement ending point;

(e) calculating a geometric shape value of the shape data while determining a geometric shape of the shape data under the geometric shape recognition conditions for the set geometric shape calculation area;

(f) calculating a geometric shape boundary value from the calculated geometric shape value; and (g) outputting the calculated geometric shape value and geometric shape boundary value.

The geometric shape boundary of the shape data is provisionally set in manners described below.

According to the first method, the data (in the specification, the shape data is also referred to as the data) is picked out from the obtained shape data at regular intervals, and the difference (a difference between the data and the previous data) of each picked-out data is calculated. An area where the differences change greatly is regarded as an area where the shape data changes greatly, and this area is provisionally set as the geometric shape boundary.

The second method comprises the steps of differentiating the shape data, which is obtained by measurement, twice to pick out an area where the shape data changes greatly, and provisionally setting the area as the geometric shape boundary.

The third method comprises the steps of:

(a) determining a provisional geometric shape in accordance with a predetermined number of shape data at the beginning of the shape data under the geometric shape recognition conditions and setting an allowable width of the provisional geometric shape;

(b) checking whether shape data is within the allowable width or not, sequentially from data following the shape data used for determining the provisional geometric shape, and provisionally setting a point out of the allowable width as a first geometric shape boundary;

(c) determining a new provisional geometric shape in accordance with a predetermined number of shape data which start at the point which was provisionally set as the first geometric shape boundary, and setting an allowable width of the new provisional geometric shape;

(d) provisionally setting a point out of the newly set allowable width as a new geometric shape boundary of the shape data; and (e) sequentially and provisionally setting the geometric shape boundaries by repeating the above steps.

The applicant of the present invention has disclosed a method of determining a geometric shape in a three-dimensional coordinate measuring machine in U.S. Pat. No. 5,434,803. This method is adopted as a method of determining the geometric shape. Since the contour shape is two dimensional in the present invention, the geometric shape can be simply determined as several types: a straight line, an ellipse and a circle.

The present invention is also directed to the automatic shape calculating apparatus, which comprises:

(a) a contour shape measuring machine for measuring a contour shape of a measured subject to output shape data;

(b) a recognition condition entering part for entering geometric shape recognition conditions;

(c) a calculation area setting part for provisionally setting a geometric shape boundary of the shape data, and for setting a geometric shape calculation area of the shape data in areas except for vicinities of the provisionally set geometric shape boundary, a measurement starting point and a measurement ending point;

(d) a geometric shape value calculating part for calculating a geometric shape value of the shape data while determining a geometric shape of the shape data under the geometric shape recognition conditions for the set geometric shape calculation area;

(e) a boundary value calculating part for calculating a geometric shape boundary value from the calculated geometric shape value; and (f) a measurement result outputting part for outputting the calculated geometric shape value and geometric shape boundary value.

BRIEF DESCRIPTION OF THE DRAWINGS

FIG. 2 is a block diagram illustrating the construction of an embodiment according to the present invention, FIG. 3 is a view of a triangular workpiece for explaining the first embodiment according to the present invention.

THE PREFERRED EMBODIMENT OF THE PRESENT INVENTION

Embodiment 1

FIG. 2 is a block d gram illustrating the construction of the first embodiment of an automatic shape calculating apparatus for a contour shape measuring machine according to the present invention.

Figure 11:
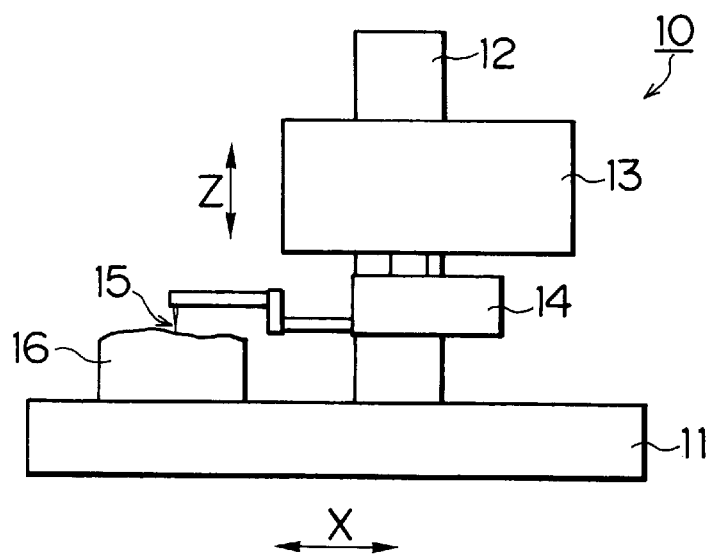
FIG. 11 is a view illustrating an ordinary contour shape measuring machine.

In FIG. 2, the contour shape measuring machine 10 is the same as the one in FIG. 11. An operator previously inputs geometric shape recognition conditions to a recognition condition input part 21.

A calculation area setting part 22 provisionally sets the geometric shape boundaries of shape data transmitted from the contour shape measuring machine 10, and sets geometric shape calculation areas of the shape data in areas except for vicinities of the provisionally set geometric shape boundaries, a measurement starting point and a measurement ending point.

A geometric shape calculating part 23 calculates a geometric shape value while determining the geometric shape of the shape data, transmitted from the contour shape measuring machine 10, under the geometric shape recognition conditions, which are input to the recognition condition designation part 21, for each of the geometric shape calculation areas which are set by the calculation area setting part 22.

A boundary value calculating part 24 calculates geometric shape boundary values from the calculated geometric shape values. A measurement result output part 25 outputs the geometric shape values, which were calculated by the geometric shape calculating part 23, and the geometric shape boundary values, which were calculated by the boundary value calculating part 24.

Figure 1:
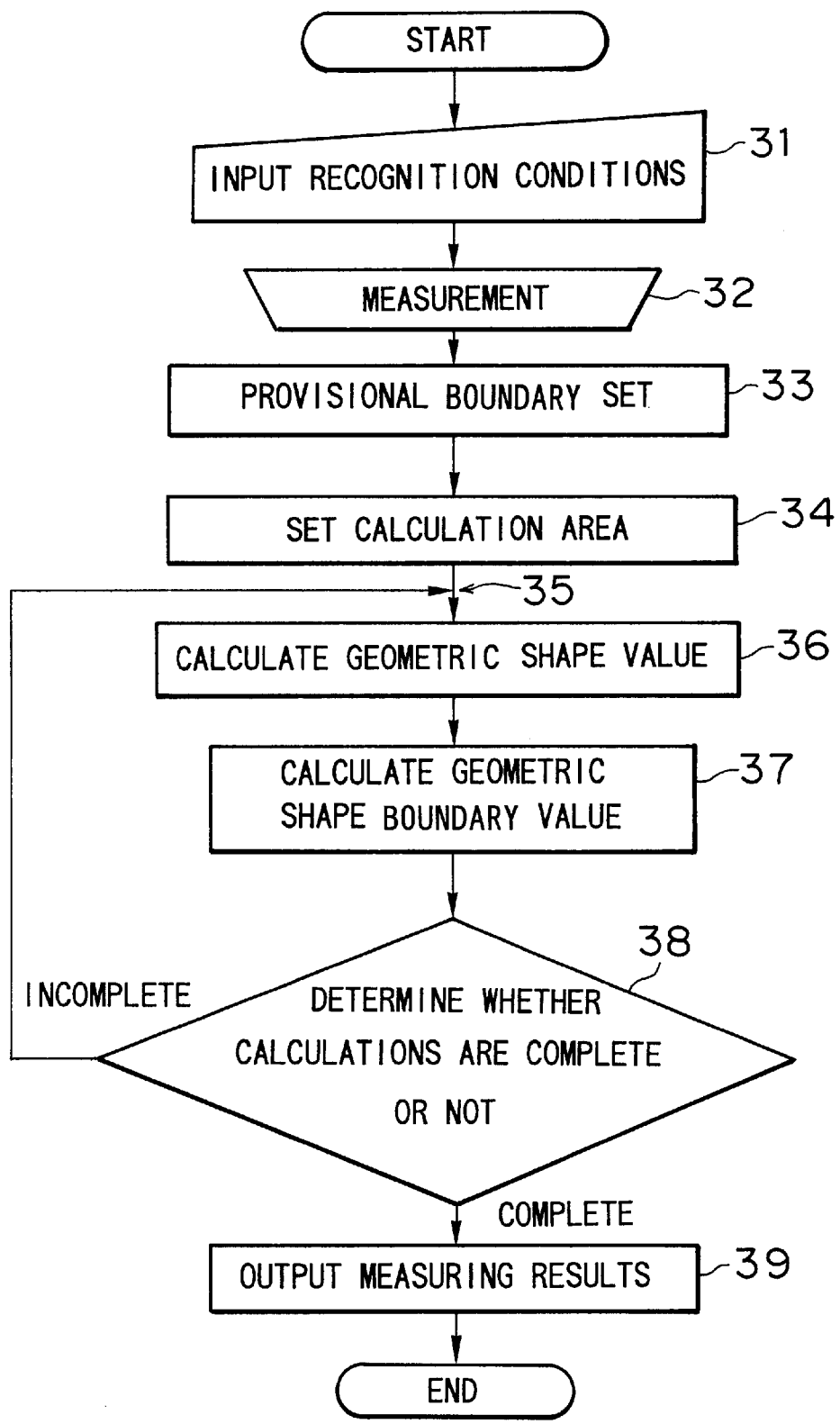
FIG. 1 is a flow chart of an embodiment according to the present invention.

FIG. 1 is a flow chart describing the first embodiment of the automatic shape calculating method for the contour shape measuring machine according to the present invention.

First, the operator previously inputs the geometric shape recognition conditions to the recognition condition input part 21 (step 31), and the contour shape measuring machine 10 measures a workpiece 16 (step 32). Then, the calculation area setting part 22 provisionally sets the geometric shape boundaries of the shape data which is transmitted from the contour shape measuring machine 10 (step 33), and sets the geometric shape calculation areas in areas except for vicinities of the provisionally-set geometric shape boundaries, the measurement starting point and the measurement ending point (step 34).

The geometric shape calculating part 23 calculates a geometric shape value from the shape data, while determining the geometric shape of the shape data under the geometric shape recognition conditions, which are input to the recognition condition input part 21, for each of the geometric shape calculation areas which are set by the calculation area setting part 22 (step 36). Then, the geometric shape value calculating part 23 calculates the geometric shape boundary values from the calculated geometric shape values (step 37).

Thereafter, it is determined whether all the calculations are complete or not (step 38). If not complete, the process returns to the step 35 so that the remaining calculations can continue, and if complete, all the measuring results are output (step 39).

A description will be given of the method in the first embodiment by way of examples.

FIG. 3 is a shape view in which values in the X-direction and Z-direction at measurement points of the shape data which is obtained by measuring a screw-like triangular workpiece of the same type as the one described in the background art are plotted. Reference numeral 51 is a measurement starting point, and 66 is a measurement ending point.

Figure 4:
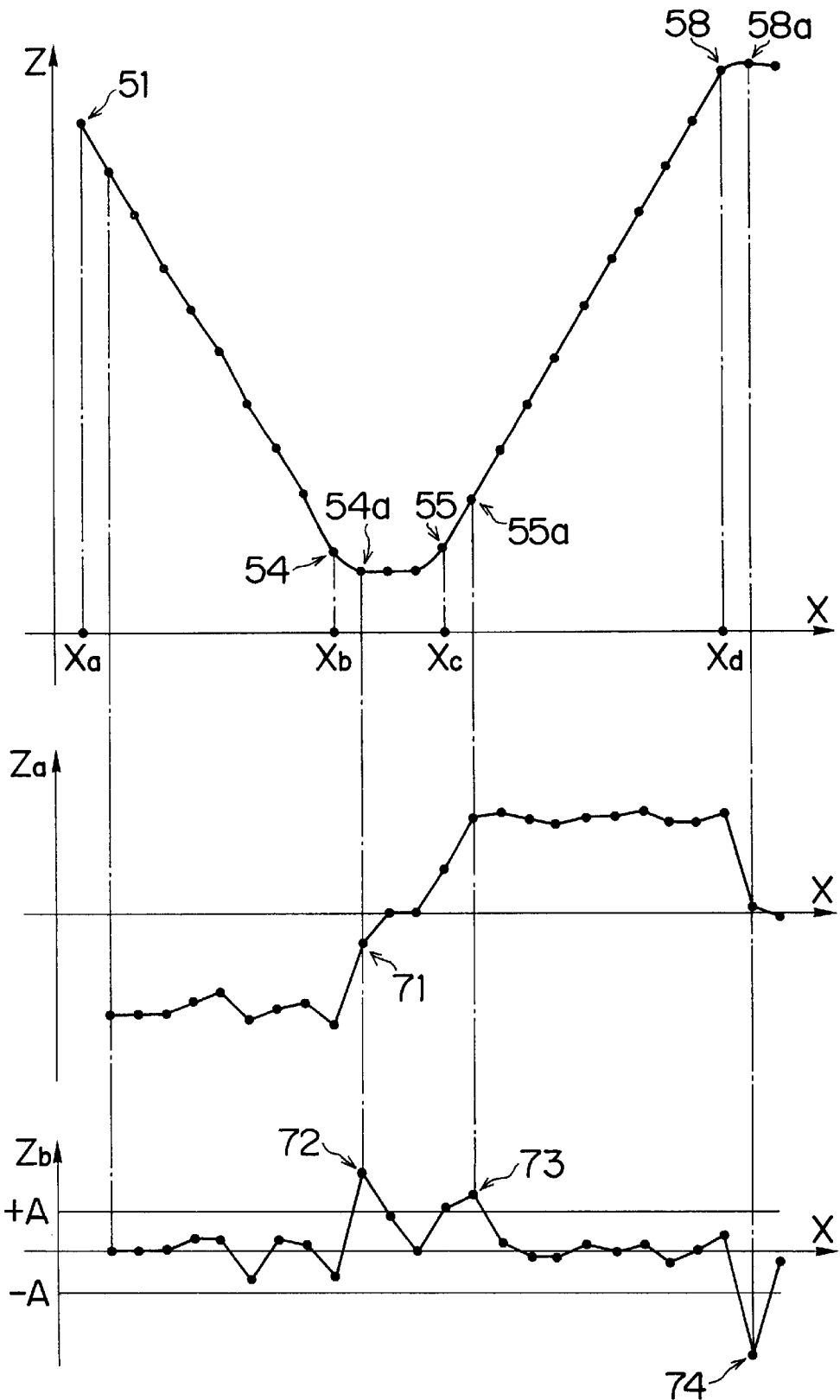
FIG. 4 is a view of assistance in explaining a method of provisionally setting geometric shape boundaries of shape data of the example in FIG. 3.

FIG. 4 is a view of assistance in explaining a method of provisionally setting the geometric shape boundaries of the shape data of the example shown in FIG. 3, and FIG. 3 is partially enlarged in the top view of FIG. 4.

The geometric shape boundary is provisionally set in the step 33 as described below.

First, the data is extracted from the shape data, which was measured by the contour shape measuring machine, at regular intervals (e.g. 10 points) in the X-direction, and the differences between the adjacent extracted data are calculated (see the central graph in FIG. 4). Then, areas where the geometric shape changes greatly in the shape data appear inclined greatly. Since it is difficult to pick out such areas, the differences between the differences of the data are calculated (see the graph at the bottom of FIG. 4). Thereby, the areas where the geometric shape changes greatly appear as large values (points out of a predetermined area "Z=−A~+A"), and the points are used to provisionally set the geometric shape boundaries.

In the central graph in FIG. 4, each difference between the shape data is plotted at the position of the later data (e.g. a difference between the shape data of a point 54 and a point 54a is plotted at a point 71 which has the same X-coordinate as the point 54a.) For this reason, the geometric shape boundary is provisionally set at the point prior to the point that is picked out in the graph at the bottom of FIG. 4 as the point where the geometric shape changes greatly in the shape data (e.g. the point 54 prior to the point 54a of the shape data, which has the same X-coordinate as the picked-out point 72.)

Likewise, the geometric shape boundaries are provisionally set at a point 55 prior to a point 55a in the shape data which has the same X-coordinate as a picked-out point 73, and a point 58 prior to a point 58a in the shape data which has the same X-coordinate as a picked-out point 74.

A description will now be given of the method of setting the geometric shape calculation area in the step 34.

In FIG. 3, the points 54, 55, 58, 59, 62 and 63 are the geometric shape boundaries, which are provisionally set in the above-mentioned method.

In the vicinities of the provisionally-set geometric shape boundaries, the measurement starting point 51 and the measurement ending point 66, the measurement error becomes great and an error occurs easily during the provisional setting of the geometric shape boundaries. Hence, it is necessary to exclude those areas from the geometric shape calculation area.

The geometric shape calculation areas are set in areas except for predetermined widths including the provisionally-set geometric shape boundaries, the measurement starting point 51 and the measurement ending point 66. The predetermined widths may be constant, but in this embodiment, the predetermined widths are found by multiplying a constant to the distances between the geometric shape boundaries, the measurement starting point 51 and the measurement ending point 66.

Specifically, the widths to be excluded are calculated in accordance with the following equations:

$$B = \alpha(Xb - Xa)$$

$$C = \alpha(Xd - Xc)$$

$$D = \alpha(Xf - Xe)$$

$$E = \alpha(Xh - Xg)$$

where Xa, Xb, Xc, Xd, Xe, Xf, Xg and Xh are the X-coordinates of the provisionally-set measurement starting point 51, geometric shape boundaries and measurement ending point 66, respectively.

Consequently, "an area between a point 52 and a point 53", "an area between a point 56 and a point 57", "an area between a point 60 and a point 61", and "an area between a point 64 and a point 65" are set as the geometric shape calculation areas.

In this example, areas between the point 54 and the point 55, between the point 58 and the point 59 and between the point 62 and the point 63 are not objects of the geometric shape value calculations because the distances between two points are too short.

Then, the geometric shape values are calculated. In the case of the triangular workpiece in FIG. 3, all the geometric shapes are determined as being straight lines. A straight line La is calculated in the area between the point 52 and the point 53, a straight line Lb is calculated in the area between the point 56 and the point 57, a straight line Lc is calculated in the area between the point 60 and the point 61, and a straight line Ld is calculated in the area between the point 64 and the point 65, and the accuracy, etc. of them are calculated, too.

A coordinate value and a crossing angle θa at an intersection 67 of the straight line La and the straight line Lb, a coordinate value and a crossing angle θb at an intersection 68 of the straight line Lb and the straight line Lc, a coordinate value and a crossing angle θc at an intersection 69 of the straight line Lc and the straight line Ld, the distances between the intersections, the accuracy of them, and so forth are calculated as the geometric shape boundary values from the geometric shape values.

A description will be given of an example wherein an arc-shaped workpiece such as a ball screw is measured.

Figure 5:
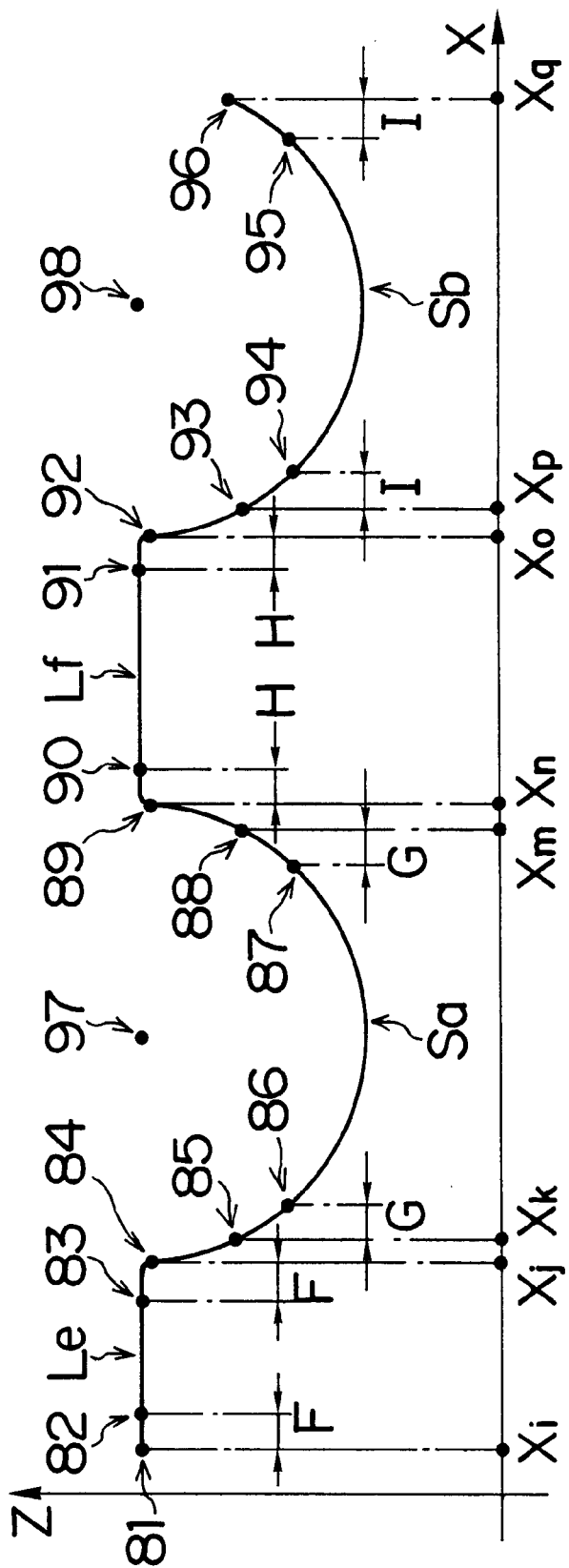
FIG. 5 is a view of an arc-shaped workpiece for explaining the first embodiment according to the present invention.
Figure 6:
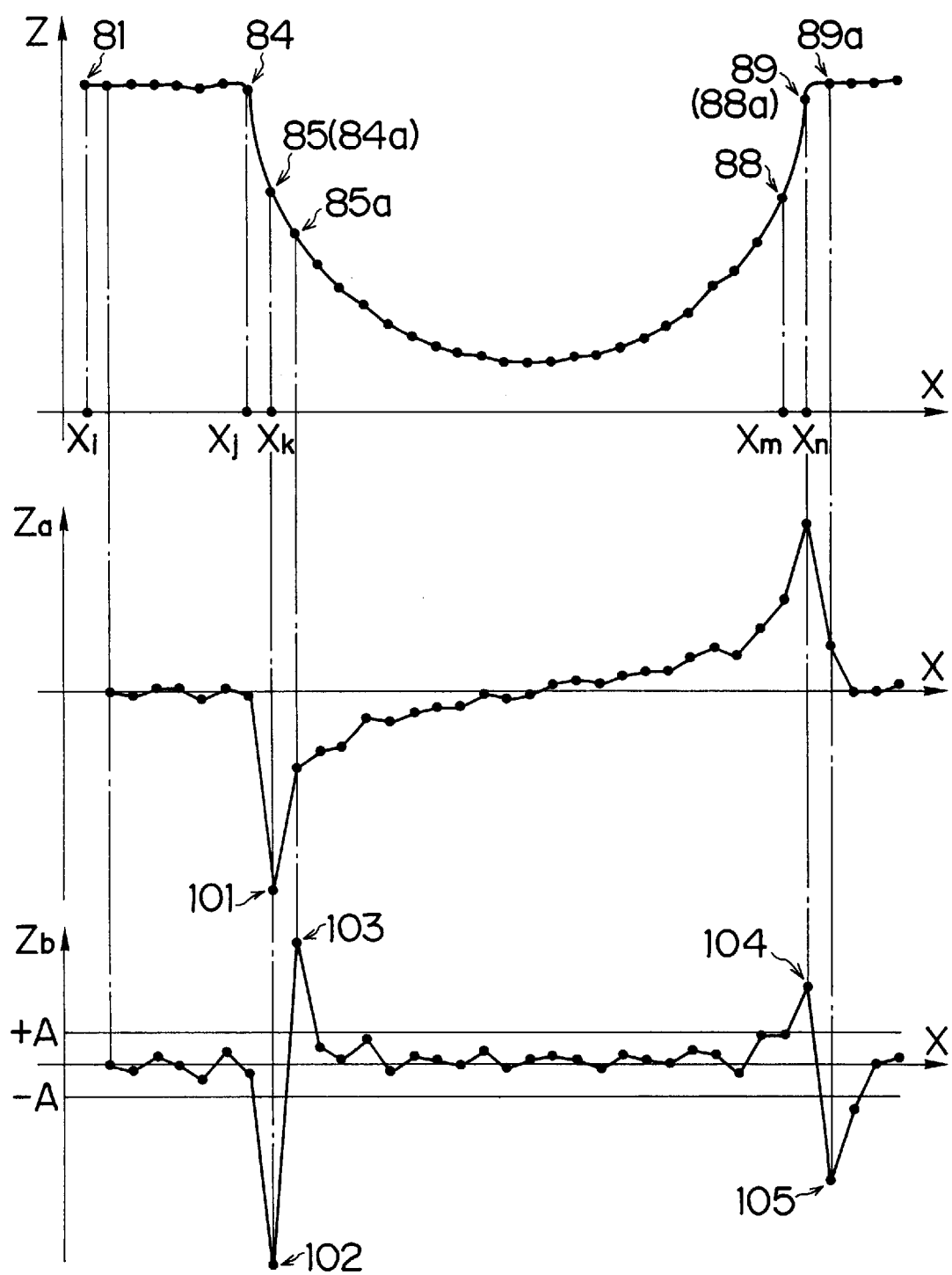
FIG. 6 is a view of assistance in explaining a method of provisionally setting geometric shape boundaries of shape data of the example in FIG. 5.

FIG. 5 is a shape view in which values in the X-direction and Z-direction at measurement points of the obtained shape data are plotted. Reference numeral 81 is a measurement starting point, and 96 is a measurement ending point. FIG. 6 is a view of assistance in explaining a method of provisionally setting the geometric shape boundaries of the shape data of the example shown in FIG. 5, and FIG. 5 is partially enlarged in the top view of FIG. 6.

As is the case with the triangular workpiece, areas where the geometric shape changes greatly in the shape data appear inclined greatly. Since it is difficult to pick out such areas, the differences between the differences of the data are calculated (see the graph at the bottom of FIG. 6). Thereby, the areas where the geometric shape changes greatly appear as great values (points out of a predetermined area "Z=−A~+A"), and the points are used to provisionally set the geometric shape boundaries.

Likewise, in the central graph of FIG. 6, each difference between the shape data is plotted at the position of the later data (e.g. a difference between the shape data of points 84 and 85 is plotted at a point 101 which has the same X-coordinate as the point 85.) For this reason, the geometric shape boundary is provisionally set at the point prior to the point that is picked out in the graph at the bottom of FIG. 6 as the point where the geometric shape changes greatly in the shape data (e.g. the point 84 prior to the point 85 of the shape data, which has the same X-coordinate as the picked-out point 102.) Likewise, the geometric shape boundaries are provisionally set at the point 85 prior to a point 85a in the shape data which has the same X-coordinate as a picked-out point 103, a point 88 prior to a point 89 in the shape data which has the same X-coordinate as a picked-out point 104, and the point 89 prior to a point 89a in the shape data which has the same X-coordinate as a picked-out point 105.

In this example, the areas where the geometric shape changes greatly appear sequentially, and hence, the geometric shape boundaries are provisionally set sequentially.

The geometric shape calculation areas are set in areas except for predetermined widths including the provisionally-set geometric shape boundaries, the measurement starting point 81 and the measurement ending point 96, and the predetermined widths are found by multiplying a constant to the distances between the geometric shape boundaries, the measurement starting point 81 and the measurement ending point 96. In FIG. 5, the points 84, 85, 88, 89, 92 and 93 are the geometric shape boundaries, which are provisionally set in the above-mentioned method. The widths to be excluded are calculated in accordance with the following equations:

$$F = \alpha(Xj - Xi)$$

$$G = \alpha(Xm - Xk)$$

$$H = \alpha(Xo - Xn)$$

$$I = \alpha(Xq - Xp)$$

where Xi, Xj, Xk, Xm, Xn, Xo, Xp and Xq are the X-coordinates of the provisionally-set measurement starting point 81, geometric shape boundaries and measurement ending point 96, respectively.

Consequently, "an area between a point 82 and a point 83", "an area between a point 86 and a point 87", "an area between a point 90 and a point 91", and "an area between a point 94 and a point 95" are set as the geometric shape calculation areas.

In this example, areas between the point 84 and the point 85, between the point 88 and the point 89 and between the point 92 and the point 93 are not objects of the geometric shape value calculations because the distances between two points are too short.

Then, the geometric shape values are calculated. In the case of the arc-shaped workpiece in FIG. 5, the area between the point 82 and the point 83 is determined as a straight line Le, the area between the point 86 and the point 87 is determined as a circle Sa, the area between the point 90 and the point 91 is determined as a straight line Lf, and the area between the point 94 and the point 95 is determined as a circle Sb. Coordinate values at the centers 97 and 98 of the circles Sa and Sb, and the diameters of the circles Sa and Sb are calculated, and the accuracy, etc. of the coordinate values and diameters is calculated, too.

An intersection of the circle Sa and the straight line Le, an intersection of the circle Sa and the straight line Lf, an intersection of the circle Sb and the straight line Lf, the distance between the centers of the circle Sa and the circle Sb, and the accuracy of them, and so forth are calculated as the geometric shape boundary values from the geometric shape values.

Embodiment 2

Since the second embodiment of the automatic shape calculating apparatus for the contour shape measuring machine according to the present invention is different from the first embodiment only in the method of provisionally setting the geometric shape boundary, the difference will be explained.

Figure 7:
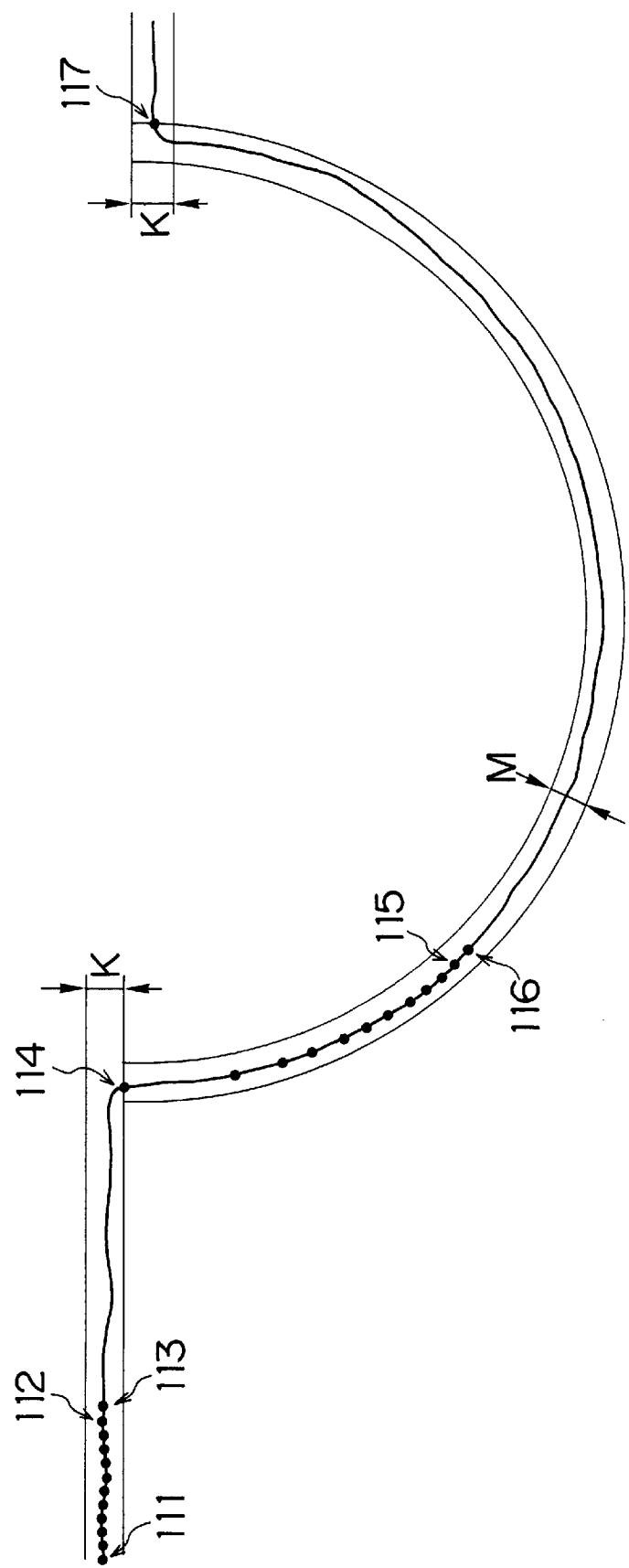
FIG. 7 is a view of assistance in explaining a method of provisionally setting geometric shape boundaries of shape data in the second embodiment according to the present invention.

FIG. 7 is a shape view in an example wherein an arc-shaped workpiece such as a ball screw is measured, as is the case with the first embodiment. In the second embodiment, the geometric shape boundary is provisionally set in a manner described below.

First, a provisional geometric shape is determined in accordance with a predetermined number of shape data (between a point 111 and a point 112) at the beginning of the obtained shape data, and an allowable width K of the provisional geometric shape is set. In this case, the provisional geometric shape is determined under the geometric shape recognition conditions as is the case where the geometric shape value is finally calculated.

Next, whether data is within the set allowable width K or not is checked sequentially from data 113 following the shape data which was used for determining the provisional geometric shape, and a point 114 out of the allowable width K is provisionally set as the first geometric shape boundary.

Further, a new provisional geometric shape is determined in accordance with a predetermined number of shape data (between the point 114 and a point 115) starting from the point 114 which is provisionally set as the geometric shape boundary, and an allowable width M of the new provisional geometric shape is set. Then, whether data is within the set allowable width M or not is checked sequentially from data 116 following the shape data which was used for determining the new provisional geometric shape, and a point 117 out of the allowable width M is provisionally set as a new geometric shape boundary.

Repeating the above-mentioned procedure provisionally sets the geometric shape boundaries of the shape data.

The shape data, which was obtained by the contour shape measuring machine, sometimes includes rough components, and the execution of the above-mentioned processing makes it difficult to pick out the area where the geometric shape changes greatly from the shape data. In order to solve this problem, the shape data is smoothed to eliminate the rough components thereof.

The applicant of the present invention has disclosed a method of determining a geometric shape in a three-dimensional coordinate measuring machine in U.S. Pat. No. 5,434,803. This method is adopted to a method of determining the geometric shape of the shape data (the method is used to calculate the geometric shape value in the first embodiment, whereas in the second embodiment, the method is used not only to calculate the geometric shape value but to provisionally set the geometric shape boundary). Since the contour shape is two dimensional, the geometric shape can be simply determined as about three types: a straight line, an ellipse and a circle.

Figure 8:
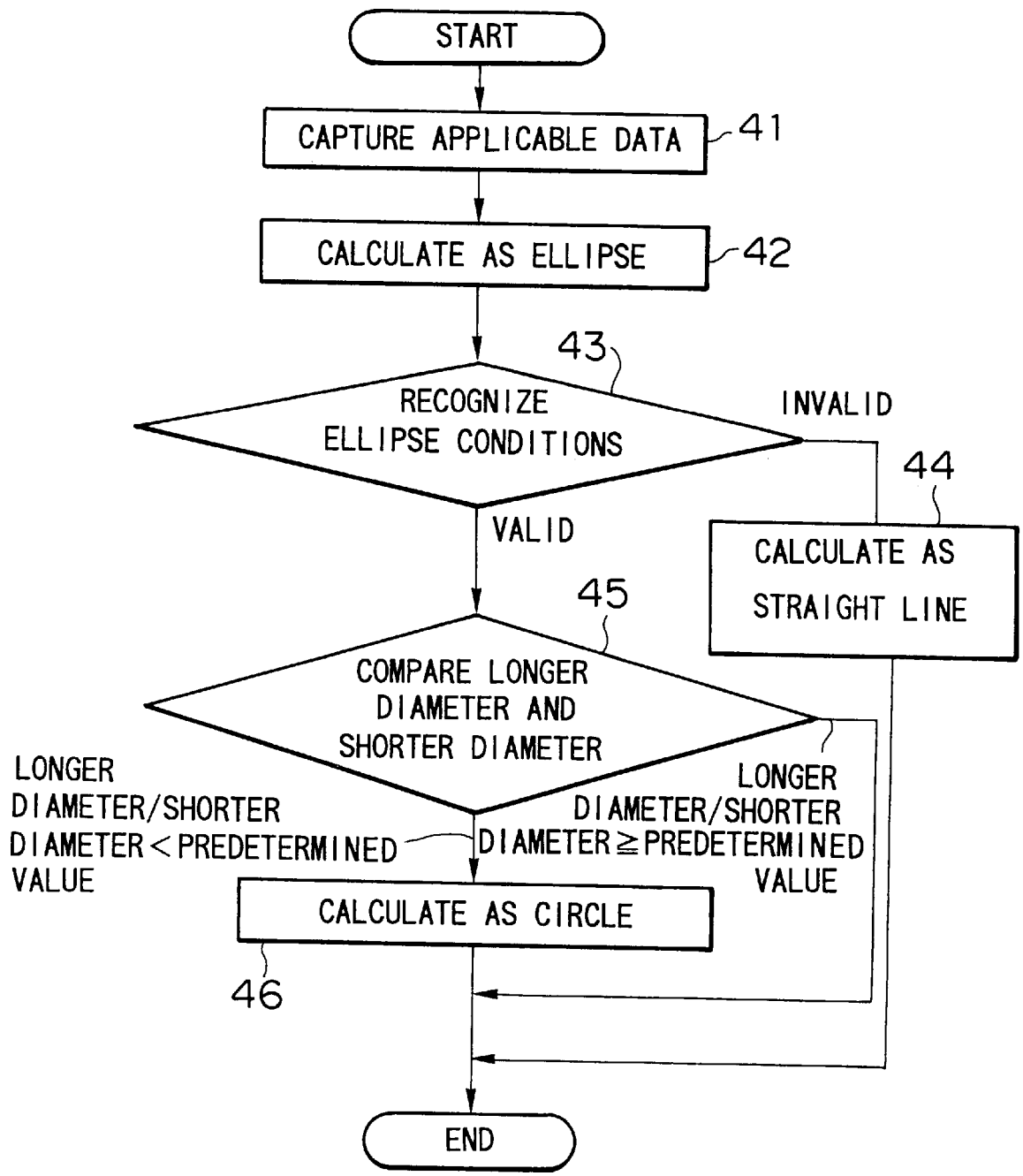
FIG. 8 is a flow chart describing a simplified method of calculating a geometric shape value.
Figure 9:
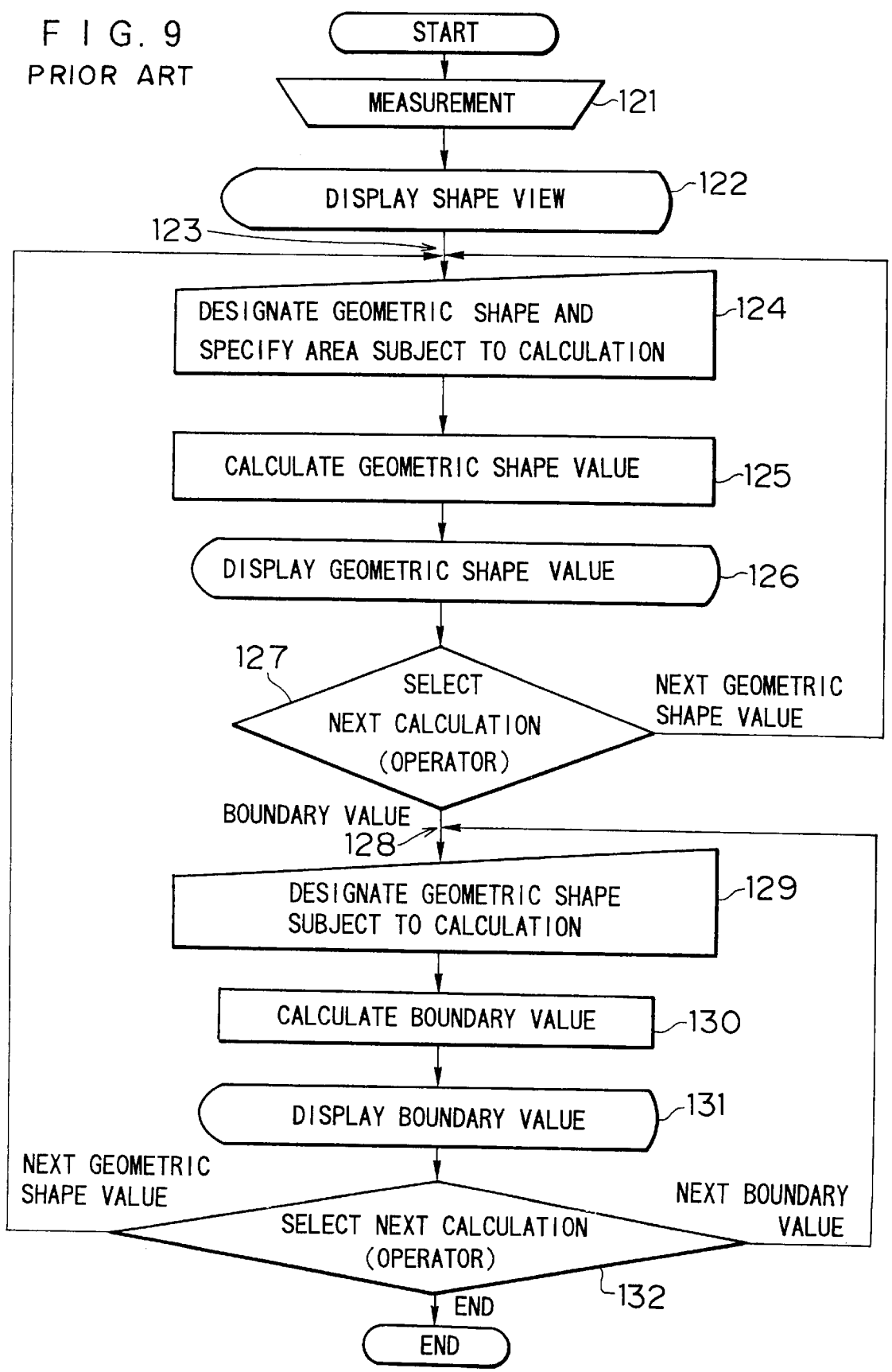
FIG. 9 is a flow chart describing a conventional shape calculating method.
Figure 10:
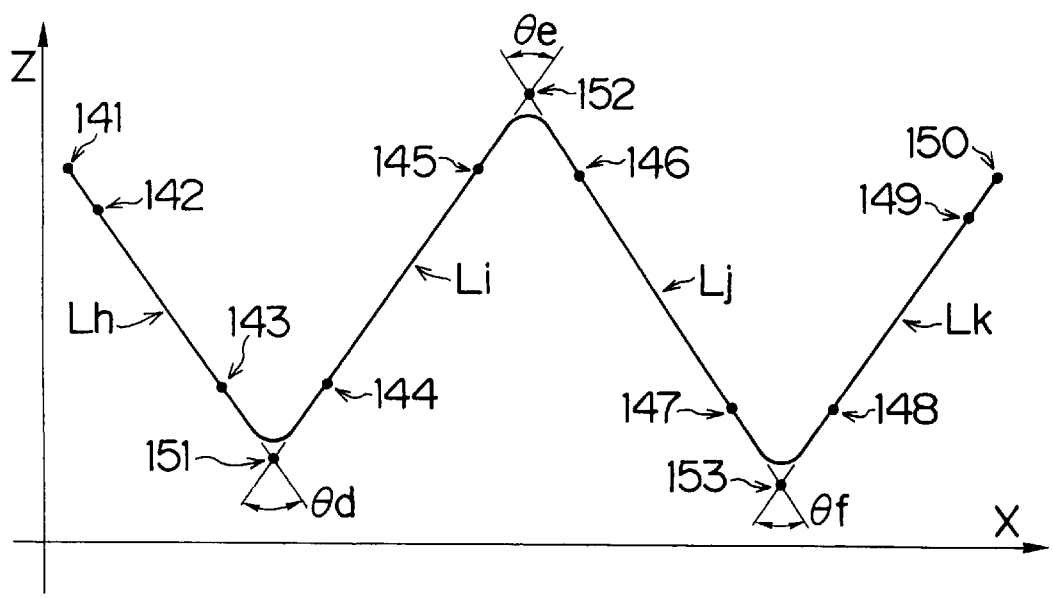
FIG. 10 is a view of a triangular workpiece for explaining a conventional shape calculating method.

This will now be explained with reference to the flow chart of FIG. 8.

First, the shape data is calculated as an ellipse. The calculated value is set as the ellipse if the calculated ellipse fulfills the following conditions:

(a) geometric conditions of an ellipse;

(b) the longer diameter of the ellipse is under a predetermined value; and (c) the ratio of the longer diameter to the shorter diameter of the ellipse is equal to or larger than a predetermined value.

If either one or two of the conditions (a) and (b) are not fulfilled, the geometric shape is determined as the straight line. If the condition (c) is not fulfilled, the geometric shape is determined as a circle.

Specifically, in the first embodiment, the shape data in one of the geometric shape calculation areas, which are set by the calculation area setting part 22, is captured into the geometric shape value calculating part 23 (step 41), and the shape data is calculated as an ellipse (step 42). Then, the calculated ellipse is examined (step 43). If either one or two of the above-mentioned conditions (a) and (b) are not fulfilled, the geometric shape is determined and calculated as a straight line (step 44).

If the conditions (a) and (b) are fulfilled in the step 43, whether the condition (c) is fulfilled or not is determined (step 45). If the condition (c) is not fulfilled, the shape data is determined and calculated as a circle (step 46). If all of the three conditions (a), (b) and (c) are fulfilled, the value which is obtained by calculating the shape data as an ellipse in the step 42 is set.

The geometric shapes are not necessarily restricted to the three types: a straight line, an ellipse and a circle. Curves such as a parabola and a hyperbola may be defined and set.

In the first embodiment, the data are picked out from the shape data at regular intervals in the X-direction, and the differences between the differences between the picked-out data are calculated in order to pick out the area where the shape data greatly changes. The area where the shape data greatly changes may also be picked out by differentiating the shape data twice.

As set forth hereinabove, according to the present invention, the shape calculating method for a contour shape measuring machine is automatically executed as follows. Specifically, the geometric shape boundary is provisionally set in accordance with the shape data which is obtained by measuring the workpiece, and the geometric shape calculation areas are set in areas except for the vicinities of the provisionally set point, the measurement starting point and the measurement ending point. The geometric shape value is calculated for each geometric shape calculation area while the geometric shape of the shape data is determined under the geometric shape recognition conditions. Then, the geometric shape boundary values are calculated from the calculated geometric shape values, and the calculating results are output.

Thus, the operator does not have to determine the types of the geometric shapes, designate the geometric shape calculation areas, and designate the geometric shape corresponding to the geometric shape boundary value. The geometric shape value and the geometric shape boundary value are automatically calculated in the automatic shape calculating method and apparatus for the contour shape measuring machine.

What is claimed is:

1. An automatic shape calculating method for a contour shape measuring machine comprising the steps of:

entering geometric shape recognition conditions;

measuring a measured subject to obtain shape data;

provisionally setting a geometric shape boundary of the shape data;

setting a geometric shape calculation area of the shape data in an area except for vicinities of the provisionally set geometric shape boundary, a measurement starting point and a measurement ending point;

calculating a geometric shape value of the shape data while determining a geometric shape of the shape data under the geometric shape recognition conditions for the set geometric shape calculation area;

calculating a geometric shape boundary value from the calculated geometric shape value; and outputting the calculated geometric shape value and geometric shape boundary value.

2. The automatic shape calculating method for the contour shape measuring machine as defined in claim 1, wherein the step of provisionally setting the geometric shape boundary comprises: picking out data at regular intervals from the shape data; calculating differences between the picked-out data; and provisionally setting an area where the calculated differences change greatly as the geometric shape boundary.

3. The automatic shape calculating method for the contour shape measuring machine as defined in claim 1, wherein the step of provisionally setting the geometric shape boundary comprises: picking out an area where the shape data changes greatly by differentiating the shape data twice; and provisionally setting the area as the geometric shape boundary.

4. The automatic shape calculating method for the contour shape measuring machine as defined in claim 1, wherein the step of provisionally setting the geometric shape boundary comprises:

determining a provisional geometric shape in accordance with a predetermined number of shape data at the beginning of the shape data under the geometric shape recognition conditions and setting an allowable width of the provisional geometric shape;

checking whether shape data is within the allowable width or not, sequentially from data following the shape data used for determining the provisional geometric shape, and provisionally setting a point out of the allowable width as a first geometric shape boundary;

determining a new provisional geometric shape in accordance with a predetermined number of shape data which start at the point which was provisionally set as the first geometric shape boundary, and setting an allowable width of the new provisional geometric shape;

provisionally setting a point out of the newly set allowable width as a new geometric shape boundary of the shape data; and sequentially and provisionally setting the geometric shape boundaries by repeating the above steps.

5. The automatic shape calculating method for the contour shape measuring machine as defined in claim 4, wherein the step of calculating the geometric shape value comprises setting the geometric shape value to one of a straight line, an ellipse and a circle.

6. An automatic shape calculating apparatus in a contour shape measuring machine, comprising;

the contour shape measuring machine for measuring a contour shape of a measured subject to output shape data;

a recognition condition entering part for entering geometric shape recognition conditions;

a calculation area setting part for provisionally setting a geometric shape boundary of the shape data, and for setting a geometric shape calculation area of the shape data in areas except for vicinities of the provisionally set geometric shape boundary, a measurement starting point and a measurement ending point;

a geometric shape value calculating part for calculating a geometric shape value of the shape data while determining a geometric shape of the shape data under the geometric shape recognition conditions for the set geometric shape calculation area;

a boundary value calculating part for calculating a geometric shape boundary value from the calculated geometric shape value; and a measurement result outputting part for outputting the calculated geometric shape value and geometric shape boundary value.

7. The automatic shape calculating method for the contour shape measuring machine as defined in claim 1, wherein the step of calculating the geometric shape value comprises setting the geometric shape value to one of a straight line, an ellipse and a circle.

8. The automatic shape calculating method for the contour shape measuring machine as defined in claim 2, wherein the step of calculating the geometric shape value comprises setting the geometric shape value of a straight line, an ellipse and a circle.

9. The automatic shape calculating method for the contour shape measuring machine as defined in claim 3, wherein the step of calculating the geometric shape value comprises setting the geometric shape value to one of a straight line, an ellipse and a circle.

* * * * *